United States Patent

[11] 3,548,157

| | | |
|---|---|---|
| [72] | Inventor | Peter Lauck, III<br>Princeton, N.J. |
| [21] | Appl. No. | 810,156 |
| [22] | Filed | March 25, 1969 |
| [45] | Patented | Dec. 15, 1970 |
| [73] | Assignee | J. P. Stevens & Co., Inc.<br>New York, N.Y.<br>a corporation of Delaware. by direct and mesne assignments |

[54] HEATING CONTROL CIRCUIT WITH TRIAC-DIAC COMBINATION
3 Claims, 2 Drawing Figs.

[52] U.S. Cl. .................................................. 219/501
[51] Int. Cl. ................................................... H05b 1/02
[50] Field of Search .......................................... 219/497, 507, 504, 505; 323/22; 219/501

[56] References Cited
UNITED STATES PATENTS
3,331,013  7/1967  Cunningham .................. 323/22
OTHER REFERENCES
GE SCR Manual 4th Edition Pages 140— 141 Copyright 1967 (copy in art unit 216)

Primary Examiner—Bernard A. Gilheany
Assistant Examiner—F. E. Bell
Attorney—Semmes & Semmes

ABSTRACT: An electrical control circuit for a flexible heating panel having an electric switch that comprises a triac essentially connected as a relaxation oscillator triggered by a diac circuit connected to its gate. Temperature control means comprising variable resistor means and a temperature sensor control and regulate the heat developed by the heating device.

3,548,157

INVENTOR
PETER LAUCK III

BY *Semmes and Semmes*

ATTORNEYS

HEATING CONTROL CIRCUIT WITH TRIAC-DIAC COMBINATION

BACKGROUND OF THE INVENTION

1. Field of the Invention

The invention relates principally to an electronic control circuit comprising a triac-diac combination for a flexible heating device. It has particular use in applications such as electric blankets and other electrically heated fabrics such as woven or nonwoven drapes, floor coverings and the like. The temperature control means "sensor" herein shall be construed to include positive temperature coefficient elements such as plusistors and sensitors or in the alternative, one thermistor which has a negative temperature coefficient. The activated heating device also includes the various combinations of SCR's with or without diacs, or Zeners built in as part of the component which shall be called "thyristor".

2. Description of the Prior Art

The prior art discloses the utilization of heating devices in which activation of the heating element is controlled by a circuit comprising a bimetallic switch or thermostat. The temperature responsive element is normally mounted in a central box that is physically separated from the heating element and the area selected to be heated. Related inventions include: P. Lauck, III, U.S. Pat. Nos. 3,385,958 issued May 28, 1968 entitled Electric Blanket; 3,422,244 issued Jan. 14, 1969 entitled Electric Blanket With a Temperature Responsive Control Circuit; 3,437,792, issued Apr. 8, 1969 entitled Electric Heating Device With Temperature Control Means. Therefore, accurate control of the temperature in the area selected to be heated is difficult to achieve. Further, such temperature responsive elements are normally slow acting, bulky, and consume relatively large amounts of power.

The above prior art comprising essentially Lauck patents further discloses both silicon controlled rectifier (SCR) circuits and a thyristor circuit such as may be connected in control circuit associated with the heating device, which is conductive in the case of the SCR in one direction, and is fired directly or by transistor trigger circuits, to selectively activate the heating element. Therefore, with SCR's the heating element can be actuated for a maximum period of time equal to one-half the period of an applied alternating current input. Triac control circuitry can also be found without temperature sensors to activate them, in the SCR Manual fourth edition of General Electric Company, reference FIGS. 9.11 and 9.13 —9.15 pp. 187 and 189 and FIGS. 7.9 page 140. See also FIG. 7.10 infra. However, the present adaption differs from the cited prior art in that it uses a full wave temperature sensor control which employs a simplified thyristor/diac circuit which is particularly suited to an electronic blanket or certain related heating devices.

SUMMARY OF THE INVENTION

The present invention comprises a triac-diac combination plus temperature sensor and capacitor to control activation of the heating device. This is essentially, therefore, a control circuit for a heating device in which the load as heating device and electric blanket controls are connected in series with a triac. The firing of the triac is controlled by a diac, in which there is control via variable resistance and a temperature sensor. In practice, it is especially valuable because it minimizes the total number of elements compared to prior art circuits. It is economical in the power consumption of the control circuit, thereby enabling the latter to be contained within a relatively small space. Thus, not only is the complexity of the control circuit for its particular usage relative to those described in the prior art substantially reduced, but also for the first time the preferred use of a positive temperature coefficient control is employed to advantage in the particular art. An alternative negative temperature coefficient control is also described hereinafter.

DETAILED DESCRIPTION OF THE INVENTION

Figure 1:
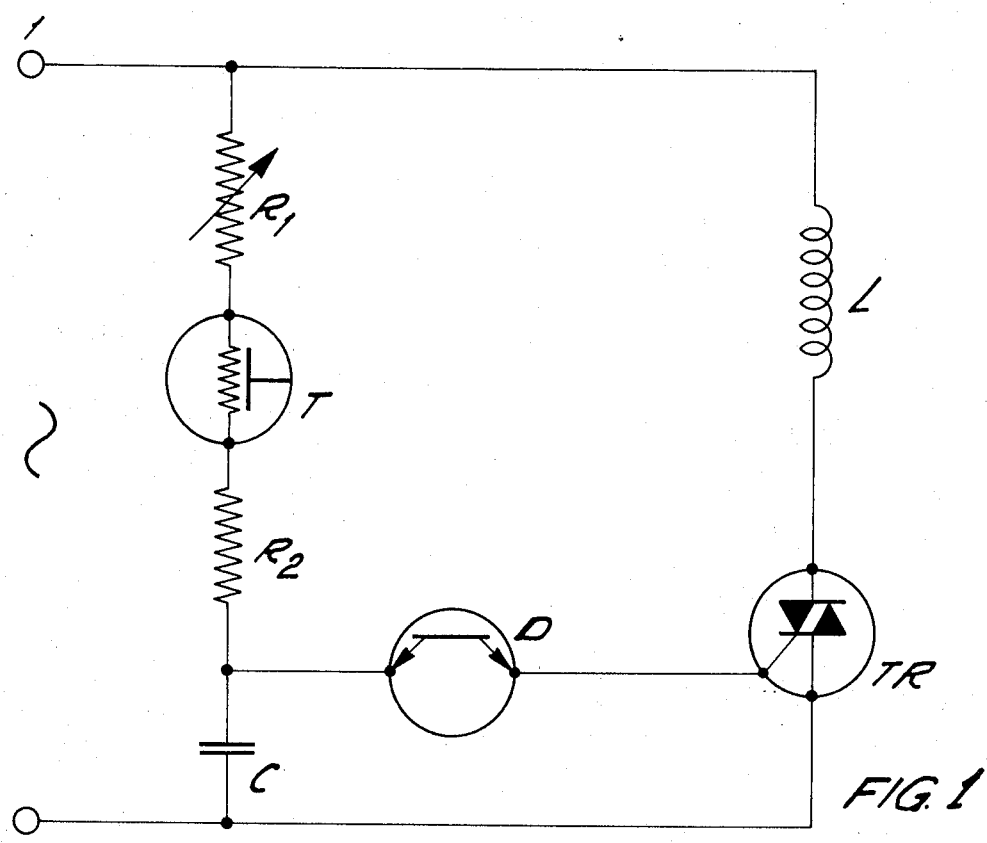
FIG. 1 depicts preferred circuitry herein, including positive temperature coefficient sensor.

FIG. 1 shows the heat control circuit according to the invention. A conventional alternating current power supply is applied between input terminals 1 and 2. The series connection of variable resistor R1, sensor T, resistor R2, and capacitor C is interconnected to terminals 1 and 2. Additionally, the series connection of heating device L and the main terminals of triac TR is also interconnected to terminals 1 and 2. Diac D is connected between the series connection of resistor R2 and capacitor C and the gate of thyristor TR. Diac D may be incorporated as part of the overall circuit in some thyristor components and in such cases would automatically be included. Heating device L may comprise a heating coil, for example. Obviously, the sensor may also be effectively connected in series with a conventional thermostat (viz: bimetallic) which in turn would regulate activation and deactivation of the sensor itself in addition to its sensing properties.

Sensor T has preferably a positive temperature coefficient, and the relative values of variable resistor R1, sensor T, resistor R2, and capacitor C are chosen to control: (A) the duty cycle of thyristor TR, depending upon the selected temperature to which the heating device is set by variable resistor R1, and (B) the actual temperature of the area controlled by the heating device which affects the temperature of sensor T.

As known, a triac or thyristor comprises a bidirectionally conductive element; further, an amount of energy at least equal to the gate threshold energy of the triac must be applied to its gate in order to fire the triac into conduction. The triac therefore may conduct during the positive or negative half cycles of the alternating current power supply applied between input terminals 1 and 2, provided an amount of energy at least equal to the gate threshold energy is applied to its gate to initiate conduction. Further, the triac continues to conduct after it is fired into conduction by application to its gate of an amount of energy at least equal to its gate threshold energy for the remainder of the corresponding positive or negative half cycle.

The combination of the thyristor or triac and diac disclosed in FIG. 1 provides full wave phase control for heating device L. The gate current applied to triac TR may lead the voltage across triac TR by a maximum of 90°, depending upon the relative values of capacitor C, and the resistances of variable resistor R1, temperature sensor T, and resistor R2. By varying the relative magnitudes of the described resistive and capacitive components, the firing angle (that point during the positive or negative half cycles at which the triac fires) and hence the duty cycle of the triac may be correspondingly varied.

Assume that variable resistor R1 is set to a predetermined value of resistance. As the temperature of temperature sensor T increases, its resistance correspondingly increases. Consequently, the voltage to which capacitor C may charge decreases, and the charging time associated with capacitor C increases. Under these circumstances, the gate current applied to triac TR is applied later during the respective half cycle and may or may not be sufficient to fire the triac into conduction, depending upon whether or not it is at least equal to the gate threshold energy of the triac or thyristor. Even if it is and thereby fires the triac into conduction, this would occur correspondingly later during the respective half cycle and consequently the duty cycle of the triac will be correspondingly decreased.

As explained above, the duty cycle of the thyristor is that time during the respective positive and negative half cycles in which it conducts and equaling that time during which the power supply is applied to heating device L. In essence, thyristor or triac TR comprises a gate circuit which activates heating device L when it is conducting, and deactivates heating device L when it is not conducting. Therefore, the longer the duty cycle of thyristor or triac TR, the longer the activation of heating device L and consequently the greater the amount of heat developed by the latter.

Thyristor or triac TR is essentially connected with other circuit elements as a relaxation oscillator, with diac D functioning as the trigger circuit therefor. Since the triac does not remove power from the control circuit after it is fired, resistor R2 is provided to limit control power.

Figure 2:
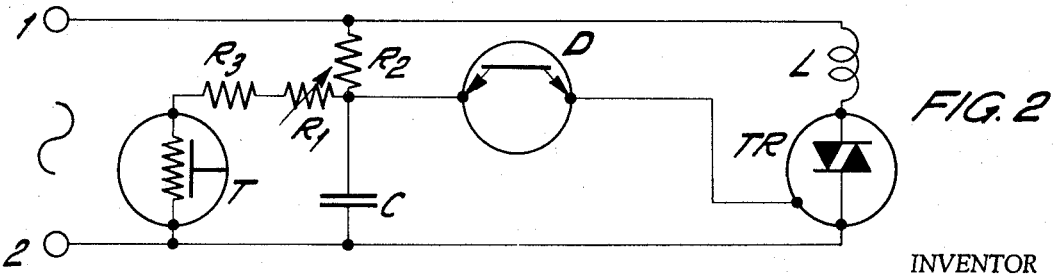
FIG. 2 depicts alternate circuitry herein, including negative temperature coefficient thermistor.

With reference to FIG. 2, it will be noted that the resistances $R_1$ and $R_2$ have been repositioned, with the sensor T now being in parallel to the condenser C, resulting in the adaptation of a negative temperature coefficient thermistor. The operation hereinafter defined with respect to FIG. 1 is thus modified to the extent that variation in component size is necessary and too, phase shift triggering varies, all within the scope of the basic concept.

OPERATION

Whereas the operation is defined in terms of the preferred form, FIG. 1, the function as to the FIG. 2 concept is essentially the same.

The electronic heating control device functions in the following manner. When the alternating current signal is applied between inputs 1 and 2, the control circuit is enabled. The temperature selection means (a thermostat, possibly) and more particularly, variable resistor R1 is adjusted to select the desired temperature to be developed by heating device L. If the actual temperature output is lower than the selected temperature, temperature sensor T will have a resistance such that thyristor or triac Tr is fired at a corresponding time during the positive and negative portions of the input signal. Therefore, the circuit of heating device L will be completed during the duty cycle of thyristor triac TR, and it will eventually provide the selected temperature. When the selected temperature is reached, the resistance of temperature sensor T will be such that triac TR will be biased to nonconduction. Then as the actual temperature decreases, the resistance of temperature sensor T will decrease. This will cause thyristor or triac TR to be driven to conduction during the positive and negative portions of the input signal to again cause heating element L to be activated. The duty cycle of the triac or thyristor TR will vary, depending upon the variance of the actual temperature from the selected temperature as determined by the setting of variable resistor R1. That is, the greater the variance, the longer the duty cycle.

If the temperature of temperature sensor T again increases in response to the rise in actual temperature, thereby increasing its resistance, the duty cycle of thyristor or tric TR will decrease and will fall to zero when the actual temperature reaches the selected temperature. The cycle described above thus repeats itself, and the actual temperature is maintained substantially constant and equal to the selected temperature.

Thus the heating control circuit will maintain the actual temperature relatively constant at the selected temperature, especially since the triac responds rapidly to variations in its gate input. Further, it is particularly advantageous for the use disclosed because of its low power consumption and minimum number of elements, thereby minimizing critical space requirements.

If the selected temperature as determined by the setting of variable resistor R1 is lower than the actual temperature, thyristor or triac TR will be biased to nonconduction until the actual temperature falls below the selected temperature. Temperature sensor T is placed in a position to be responsive to the actual temperature of the area or element being controlled by heating device L.

Reducing the resistance value of resistor R1 will increase the desired selected temperature and hence the duty cycle of triac TR, and increasing the resistance value of resistor R1 will decrease the desired selected temperature and hence the duty cycle of thyristor or triac TR.

Of course, an on-off switch, overload protection device, and an indicator light (not shown) may be provided for use in conjunction with the described control circuit. These are not shown because they are conventional in the art. Further a potentiometer may be substituted for variable resistor R1, and a negative temperature coefficient thermistor may be used with appropriate changes in other circuit elements.

It will be evident that many changes could be made in the systems of the invention without departure from the scope thereof. Accordingly, the invention is not to be considered limited to the particular embodiments disclosed herein, but only by the scope of the appended claims. It is therefore intended by the appended claims to cover all such modifications and adaptations as fall within the true spirit and scope of the invention.

One such innovation includes:

A small bimetallic thermostat, when placed against a Thyristor, SCR or Triac, or other device or devices, senses their temperature when they are turned on and when connected to the reference supply voltage of the Lauck circuits regulates such supply voltage and cuts it off to a preset temperature of the thyristors'case. This provides a complete breaking of the circuit within the control element itself and complements the existing electronics of the thermistor controls. In a true sense, therefore, it provides a fail-safe for conditions of abuse in the uses that we have patented.

I claim:
1. A control circuit for a flexible heating device comprising:
   A. a power supply having first and second output terminals;
   B. a thyristor between said terminals comprising a triac and having first and second main terminals and a gate connected across the said output terminal;
   C. a heating element, the series connection of th heating element and the first and second main terminals being interconnected with said thyristor and said terminals;
   D. series connection of variable resistance and a full-wave negative temperature sensor, including a thermostatic switch, the parallel connection with said sensor of capacitance means, said parallel connection including a resistor, all interconnected to the said first and second output terminals; and
   E. a diac connected between the gate of the temperature sensor and one plate of the capacitance means, the other plate of the capacitance means being connected to one of the first and second output terminals, said sensor responding to trigger the thyristor triac upon preselected setting of the variable resistance.

2. The circuit of claim 1 in which the thyristor includes a thermostatic switch.

3. The circuit of claim 2 in which the thermostatic switch is a bimetallic element.